US008827538B2

(12) United States Patent
Padmanabhan

(10) Patent No.: US 8,827,538 B2
(45) Date of Patent: Sep. 9, 2014

(54) BARREL COOLING AND HEATING SYSTEM FOR SCREW EXTRUDER

(75) Inventor: Babu Padmanabhan, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 1029 days.

(21) Appl. No.: 12/882,991

(22) Filed: Sep. 15, 2010

(65) Prior Publication Data
US 2011/0063939 A1    Mar. 17, 2011

(30) Foreign Application Priority Data

Sep. 15, 2009 (IN) .......................... 2233/CHE/2009

(51) Int. Cl.
| | |
|---|---|
| *B29B 7/80* | (2006.01) |
| *B29B 7/48* | (2006.01) |
| *B29C 47/08* | (2006.01) |
| *B29C 47/82* | (2006.01) |
| *B29C 47/66* | (2006.01) |
| *B01F 15/00* | (2006.01) |
| *B29B 7/82* | (2006.01) |
| *B29C 47/40* | (2006.01) |
| *B29C 47/00* | (2006.01) |

(52) U.S. Cl.
CPC ............... *B29B 7/48* (2013.01); *B29C 47/0822* (2013.01); *B29B 7/82* (2013.01); *B29C 47/822* (2013.01); *B29C 47/662* (2013.01); *B29C 47/0835* (2013.01); *B29C 47/0849* (2013.01); *B29C 47/0827* (2013.01); *B01F 15/00928* (2013.01); *B29C 47/0864* (2013.01); *B29C 47/82* (2013.01); *B29C 47/825* (2013.01); *B29C 47/40* (2013.01); *B29C 47/0009* (2013.01); *B29C 47/0866* (2013.01); *B29C 47/0877* (2013.01); *B29C 47/66* (2013.01)
USPC ............................................................ 366/79

(58) Field of Classification Search
CPC .... B29C 47/0835; B29C 47/0827; B28B 7/80
USPC .............................. 366/84, 85, 79, 83, 80, 90
See application file for complete search history.

(56) References Cited

U.S. PATENT DOCUMENTS

| | | | | |
|---|---|---|---|---|
| 3,590,429 | A | * | 7/1971 | Bammert et al. ......... 425/192 R |
| 3,696,736 | A | * | 10/1972 | Studli ........................... 100/146 |
| 3,866,669 | A | | 2/1975 | Gardiner |
| 4,028,027 | A | * | 6/1977 | Worz ........................ 418/201.1 |
| 4,383,764 | A | * | 5/1983 | Sloin ............................. 366/75 |
| 4,385,876 | A | * | 5/1983 | Scherping et al. ......... 418/201.1 |
| 4,415,268 | A | * | 11/1983 | Brinkmann et al. ............ 366/85 |
| 5,209,937 | A | * | 5/1993 | Kangas ......................... 425/183 |
| 2009/0086568 | A1 | * | 4/2009 | Holmes et al. .................. 366/85 |
| 2009/0175118 | A1 | * | 7/2009 | Kasliwal ......................... 366/85 |
| 2011/0063939 | A1 | * | 3/2011 | Padmanabhan ................. 366/79 |

* cited by examiner

*Primary Examiner* — Tony G Soohoo
(74) *Attorney, Agent, or Firm* — Kilpatrick Townsend & Stockton LLP

(57) ABSTRACT

An extruder barrel section is disclosed. The extruder barrel section comprises of a first barrel pad and a second barrel pad. The first and second barrel pad co-operating to define a recess configured to receive an extruder liner. The length of the first and second barrel pad is less than the length of the extruder liner such that the extruder liner defines an end surface that projects beyond the extruder barrel section on at least one side. The end surface is configured to abut the end surface of another extruder liner. The extruder barrel section further comprises of a locking structure configured to lock the first barrel pad to the second barrel pad with the extruder liner therebetween.

5 Claims, 13 Drawing Sheets

BARREL COOLING AND HEATING SYSTEM FOR SCREW EXTRUDER

The present invention relates to screw extruders and, more particularly to a barrel section for a twin screw extruder.

BACKGROUND

Screw extruders are machines in which material such as polymers, elastomers, etc. are processed and then the extruded material is processed by a plurality of dies to form the required product. A typical screw extruder comprises at least one extruder screw shaft where each of the extruder screw shafts has a set of extruder screw elements mounted on them. The extruder screw shafts along with extruder screw elements are housed in a barrel. The barrel comprises multiple barrel sections which are joined end to end. Multiple barrel sections are required to carry out different processes involved in extrusion such as conveying, kneading, mixing, devolatilizing, metering and the like. Each barrel section comprises a liner which is press fit into a barrel casing, and heating and cooling elements are provided to regulate temperature of barrel section within permissible range.

During the process of extrusion, the surface of the liner is subject to intensive abrading action. Due to this, the liner undergoes continuous wear. Hence, for proper extrusion process, the liner has to be replaced after a certain period of time. Since the liner is press fit into the barrel casing, the conventional barrel, sections make the replacement of the liner a cumbersome process.

Further, the conventional extruders have cooling channels drilled in the barrel casing with metal plates welded at the ends of the barrel casing to form a closed water cooling circuit. The temperature across the barrel section is regulated by circulating coolant such as water through the cooling channels. The water circulated in the cooling channels absorbs the externally transferred heat and the heat generated from the processing of the material, and evaporates leaving behind scales of salts on the surface of the cooling channels. Due to the formation of these scales, the inner surface of the cooling channels needs to be cleaned regularly. The conventional extruders require the welding plates to be removed from the ends of the barrel casing for cleaning purposes, which is a cumbersome process and may also result in damage to the liner.

The existing barrel sections further fail to ensure uniform temperature across the inner surface of liner. Due to this, consistency in the mechanical properties of the extruded material may be affected. A significant disadvantage of the current art is that parts that are not at the process temperature are clamped together, causing stresses in the extruder barrel.

In light of the above limitations, there is a need for a barrel casing for barrel sections in the screw extruder that enables easy replacement of liner, enables easy cleaning of cooling channels and maintains uniform temperature at the inner surface of the liner.

SUMMARY

An extruder barrel section is disclosed. The extruder barrel section comprises of a first barrel pad and a second barrel pad. The first and second barrel pad co-operating to define a recess configured to receive an extruder liner. The length of the first and second barrel pad is less than the length of the extruder liner such that the extruder liner defines an end surface that projects beyond the extruder barrel section on at least one side. The end surface is configured to abut the end surface of another extruder liner. The extruder barrel section further comprises of a locking structure configured to lock the first barrel pad to the second barrel pad with the extruder liner therebetween.

According to an aspect of the invention, another extruder barrel section is also disclosed. The extruder barrel section comprises of a first barrel pad, a second barrel pad and an extruder liner. The first and second barrel pad co-operating to define a recess configured to receive the extruder liner. The length of the first and second barrel pad is less than the length of the extruder liner such that the extruder liner defines an end surface that projects beyond the first and second barrel pads on at least one side. The end surface is configured to abut the end surface of another extruder liner. The extruder barrel section further comprises of a locking structure configured to lock the first barrel pad to the second barrel pad with the extruder liner therebetween.

DETAILED DESCRIPTION

In the following description, for the purposes of explanation, specific details are set forth with respect to a twin screw extruder in order to provide a thorough understanding of the invention. However, it will be apparent that the invention may be practiced without these specific details. Also, it will be apparent that the invention is not limited to twin screw extruders.

The present invention will be discussed hereafter in detail with reference to accompanying drawings and embodiments.

Figure 1:
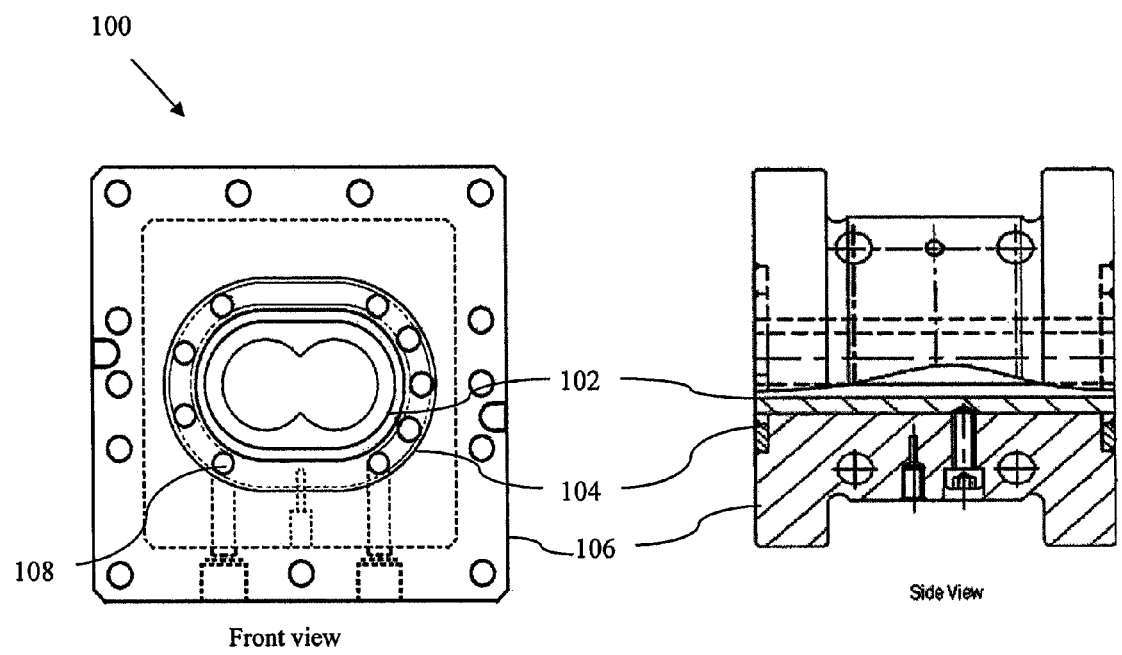
FIG. 1 is the front view and side view of barrel section known in the art.

FIG. 1 is the front view and the side view of barrel section 100 of a twin-screw extruder, known in the art. Barrel section 100 includes extruder liner 102, barrel casing 104, and cover plate 106. Extruder liner 102 is provided with two parallel overlapping through cylindrical bores which forms a processing zone. Two sets of intermeshing extruder elements mounted on the screw shafts rotate inside these bores. Extrusion process of the material takes place between the pair of extruder elements and between extruder liner 102 and extruder elements.

Extruder liner 102 is press fit within barrel casing 104. During the extrusion process, barrel casing 104 gets heated from the heat generated from the processing of material inside and the heat transferred externally. To maintain the temperature of the barrel sections within pre-determined limits, barrel casing 104 has cooling channels 108 drilled in it for the flow of a coolant, including but not limited to, water. Cover plates 106 are welded at each end of barrel casing 104 for plugging cooling channels 108 and to form a complete cooling circuit.

Barrel section 100, however, is ineffective in ensuring uniform temperature across extruder liner 102 and barrel casing 104. Further, the replacement of worn-out extruder liner 102 is a cumbersome process as it requires the removal of barrel casing 104, which is press fit on extruder liner 102. Moreover, the cleaning of cooling channels 108 for removal of scales of salts also requires removal of barrel casing 104, which further includes removal of the welded cover plates 106.

Figure 2A:
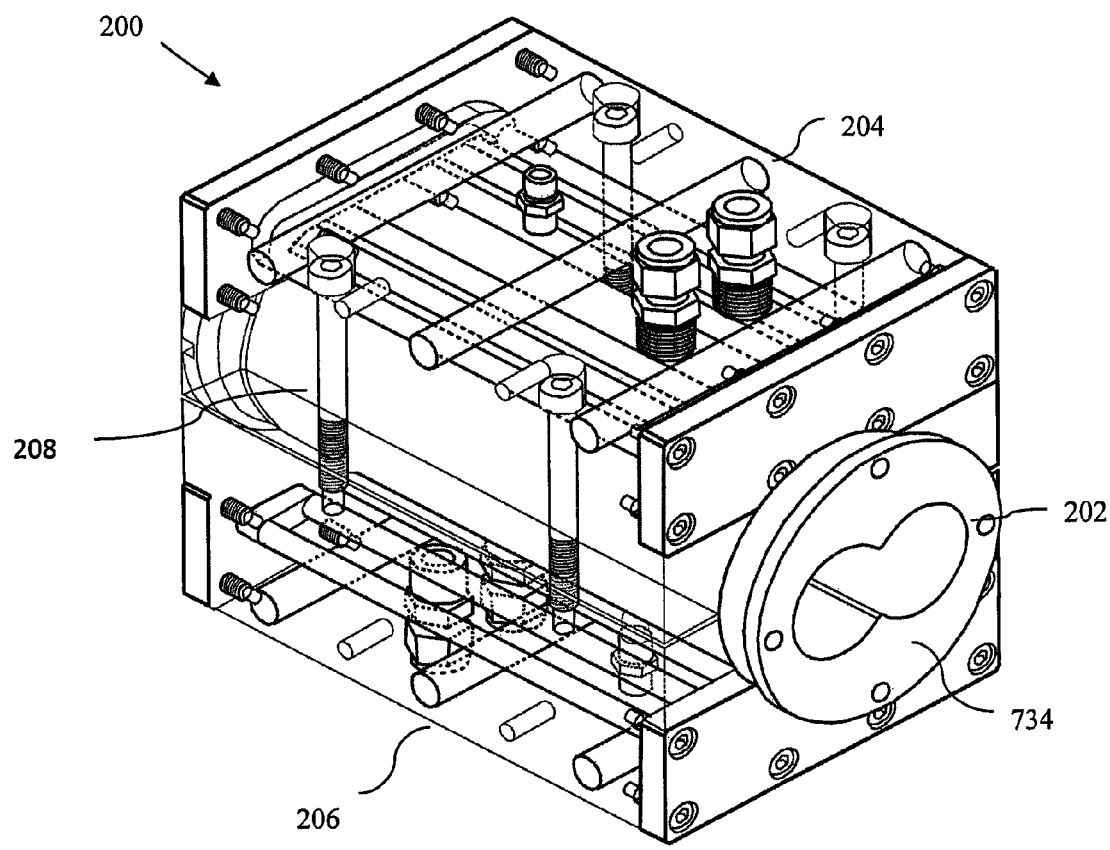
FIG. 2A and FIG. 2B are the isometric view and the front view respectively of a barrel section, according to an embodiment of the invention.

FIG. 2A is the isometric view of barrel section 200, according to an embodiment of the invention. Barrel section 200 includes extruder liner 202, first barrel pad 204, second barrel pad 206 and clamping screws 208, each described in detail in conjunction with subsequent drawings. The first barrel pad and the second barrel pad co-operate to define a recess that is configured to receive the extruder liner therebetween. The length of the barrel pads is less than the length of the extruder liner received between them. As illustrated, the extruder liner projects outside the barrel section formed by the first barrel pad and the second barrel pad defining an end surface 734. The end surface is configured to abut the end surface of an adjacent extruder liner (not shown). The end surfaces of adjacent liners may be clamped together using a clamping system 700 as described in detail below with reference to FIG. 8.

Figure 2B:
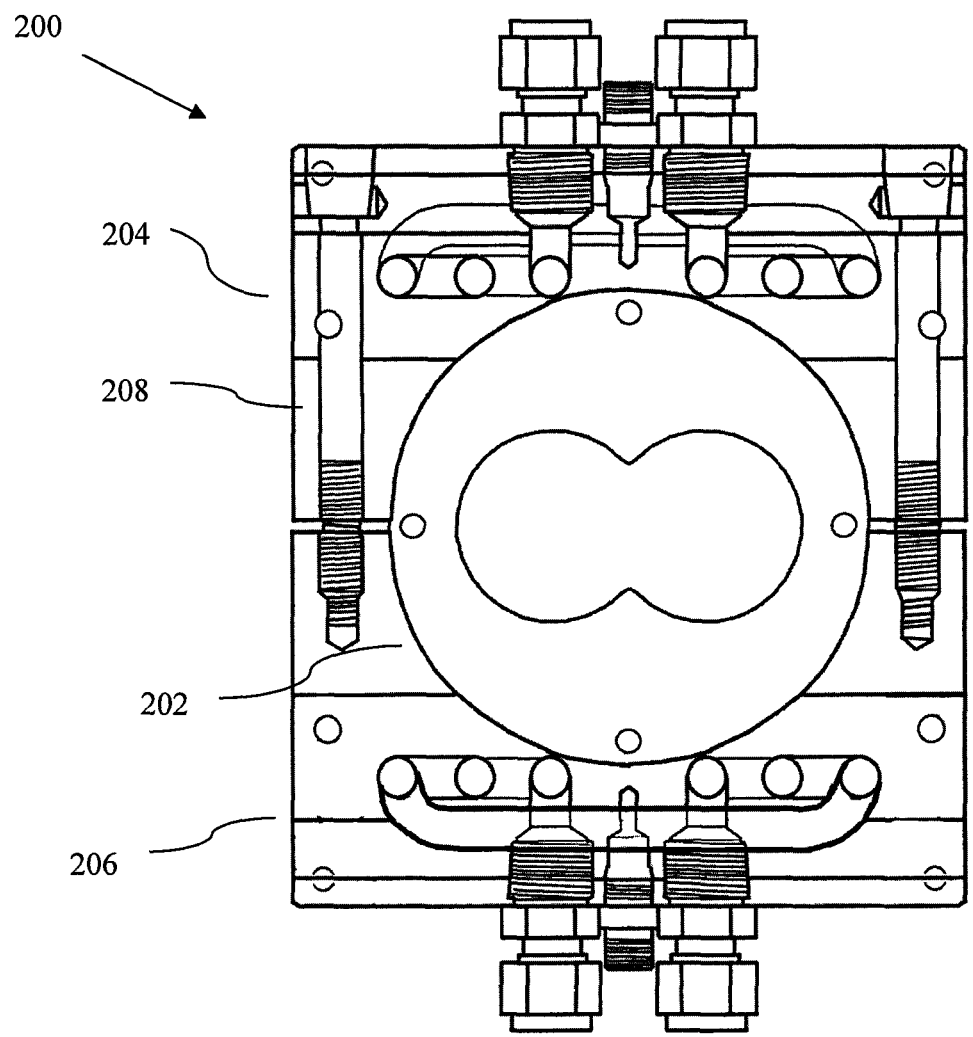

FIG. 2B is the front view of barrel section 200, according to an embodiment of the invention. Barrel section 200 comprises a barrel casing into two halves split along a horizontal plane. First barrel pad 204 and second barrel pad 206 of barrel section 200 are mounted on extruder liner 202 and clamped to each other using clamping screws 208. Thus, to replace a worn-out extruder liner 202, clamping screws 208 are unscrewed, then first barrel pad 204 and second barrel pad 206 are dismantled and finally, extruder liner 202 is replaced.

Figure 3:
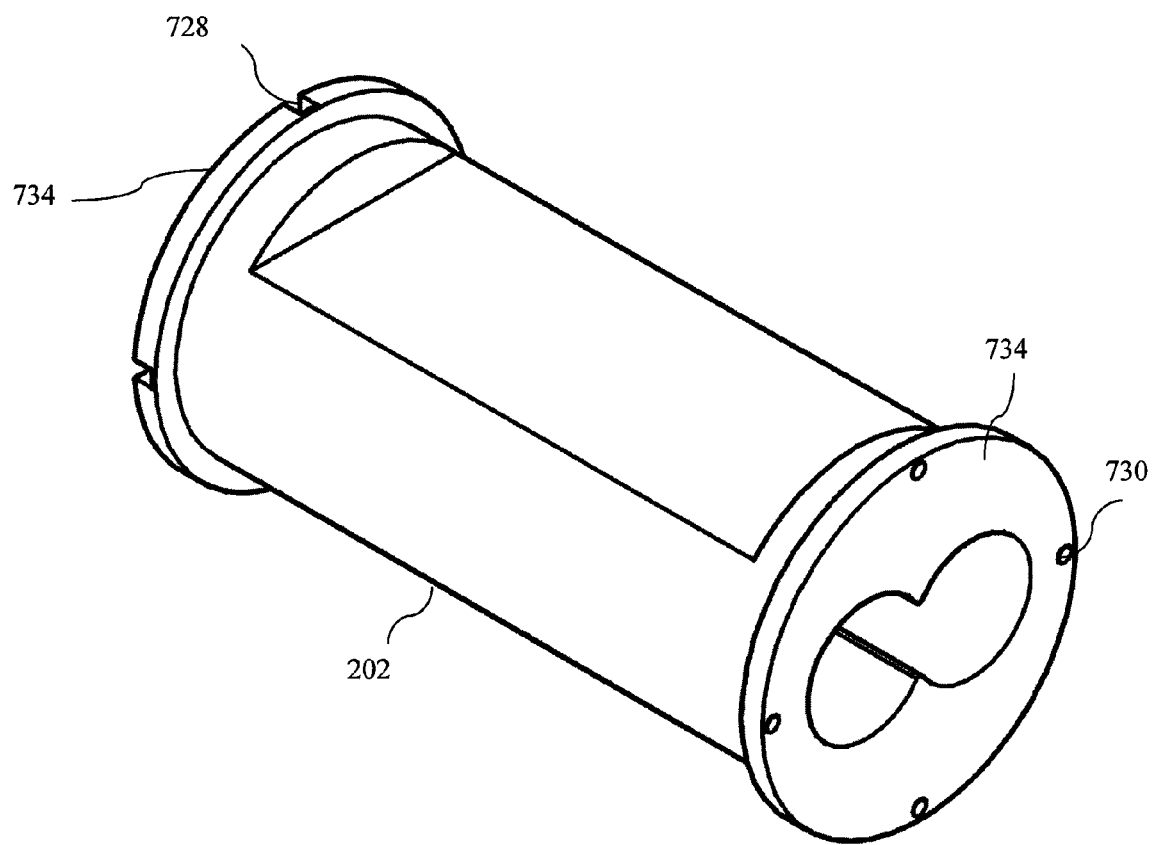
FIG. 3 is the isometric view of an extruder liner of barrel section, according to an embodiment of the invention.

FIG. 3 is the isometric view of extruder liner 202, according to an embodiment of the invention. Extruder liner 202 is provided with two parallel overlapping through cylindrical bores, for extrusion process. Extruder liner 202 is generally made of a hard material, as extruder liner 202 undergoes continuous abrasive wear from the extrusion process. Depending on the specific requirements of the material being processed, extruder liner 202 may be made of either wear resistant material, including but not limited to, EN41B, AISI H13, AISI D2, AISI A11, etc. or corrosion resistant material, including but not limited to, AISI 431, AISI 440C, Modified AISI 440C, etc.

Figure 4A:
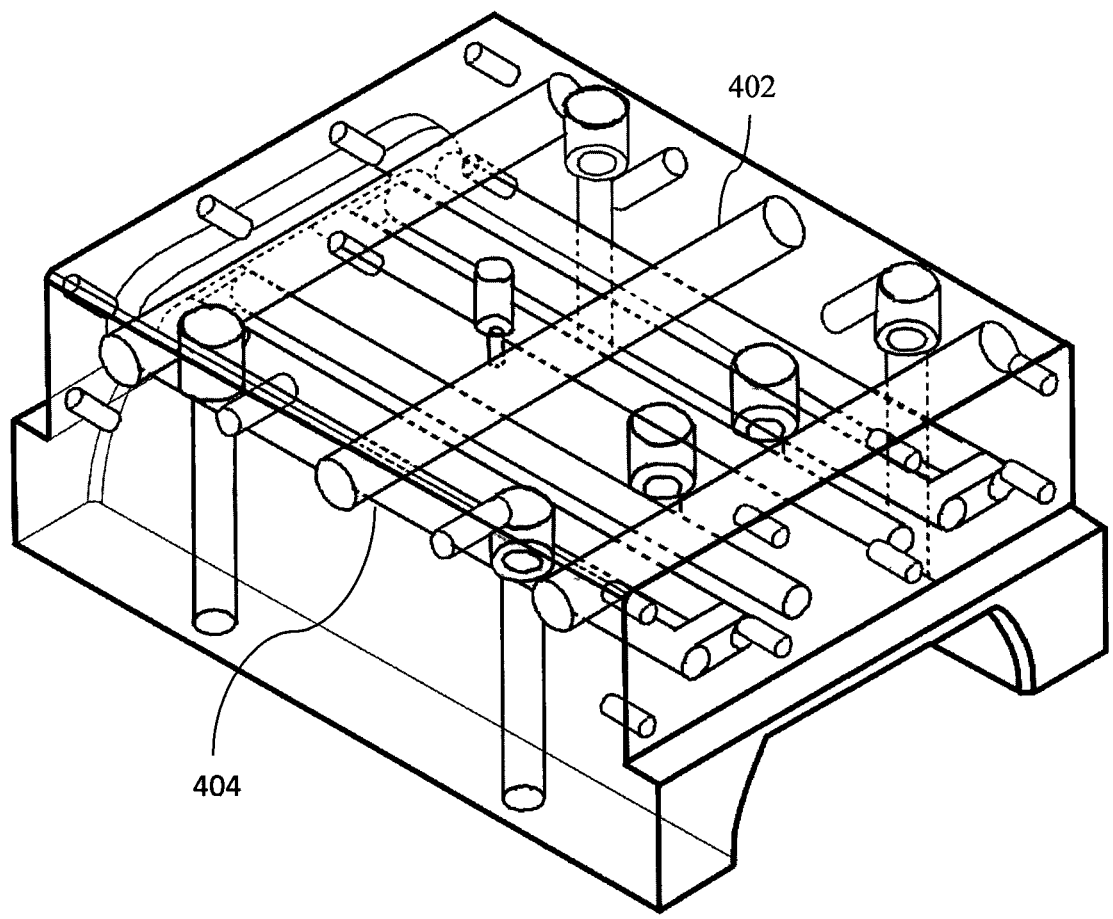
FIG. 4A, FIG. 4B and FIG. 4C are the isometric view, the front view and the side view respectively of a first barrel pad, according to an embodiment of the invention.

FIG. 4A is the isometric view of first barrel pad 204 according to an embodiment of the invention. First barrel pad 204 is made of a material that has high thermal conductivity. Use of such material ensures high rate of heat transfer throughout the volume of first barrel pad 204, thus helping in maintaining uniform temperature. Examples of material used for first barrel pad 204 include aluminum and copper and their alloys such as bronze. The material for the barrel pad 204 may be used depending on the temperature ranges to be maintained for the extrusion process.

According to another embodiment, one or both barrel pads may be provided with a heating structure to heat the barrel pad. The heating structure may be a plurality of heating rods 402 inserted in first barrel pad 204 to provide heat for keeping the extruded material at the required temperature. In accordance with an aspect, a cartridge heater along with a barrel pad of high conductivity material is used to ensure uniform temperature of the barrel pads.

In accordance with an aspect one or both barrel pads may be provided with a cooling structure that help in cooling the barrel pads and in ensuring uniformity in temperature. A plurality of cooling channels 404 is drilled inside first barrel pad 204 for flow of coolant. The coolant such as water is passed through cooling channel 404 to prevent overheating of first barrel pad 204, maintaining the temperature of first barrel pad 204 within certain pre-determined range.

Figure 4B:
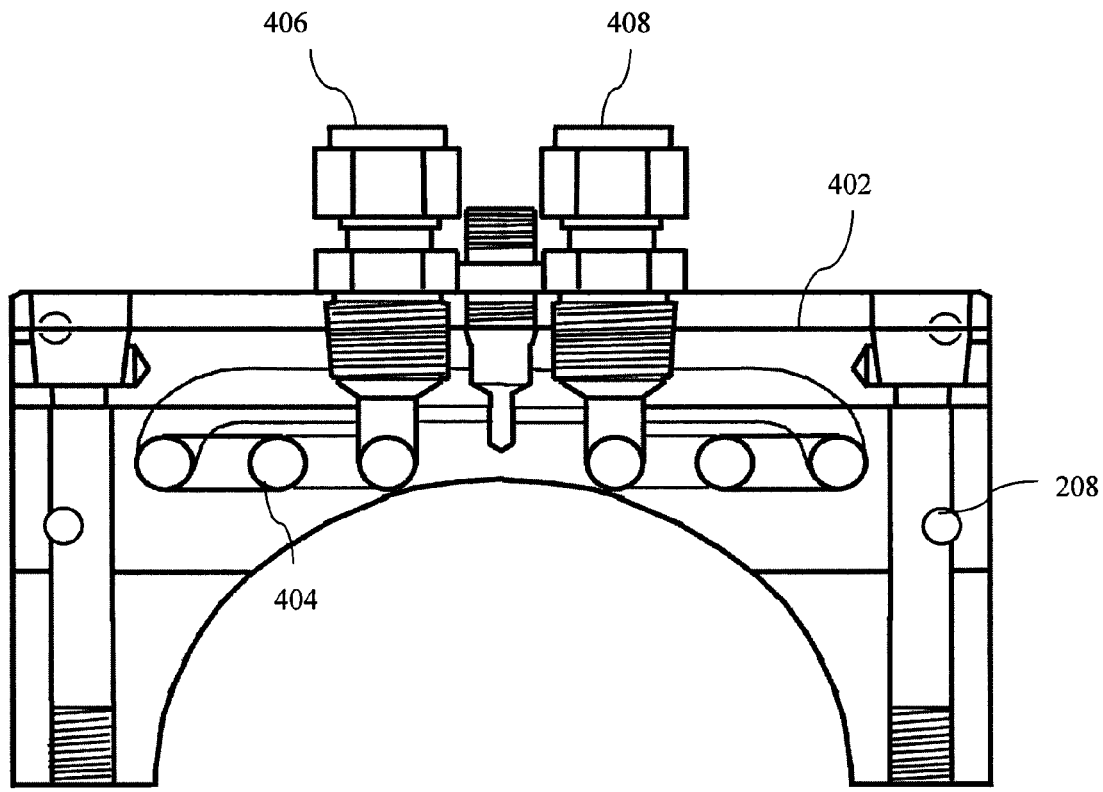

FIG. 4B is the front view of first barrel pad 204 showing inlet 406 and outlet 408 of cooling channel 404. Inlet 406 allows coolant to enter into cooling channel 404, while outlet 408 provides exit for coolant after its circulation.

Figure 4C:
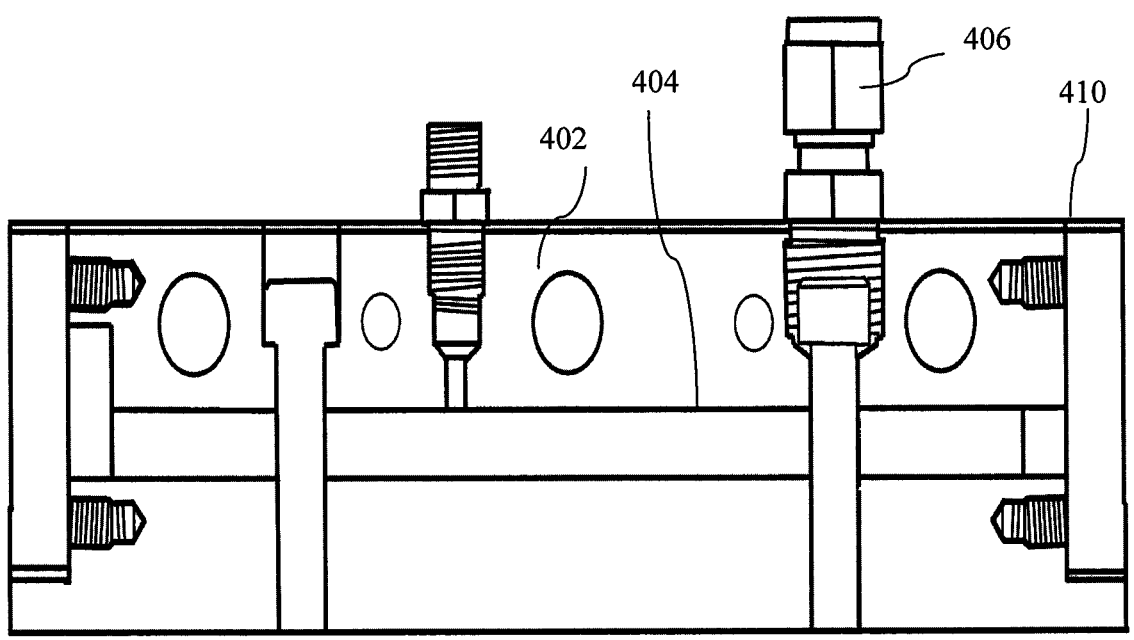

FIG. 4C is the side view of first barrel pad 204. Cooling channel 404 is plugged at both ends with cover plates 410. Cover plate 410 is screwed into first barrel pad 204 to enable its easy removal for cleaning of cooling channel 404 of scales of salts left from the vaporization of water.

Figure 5:
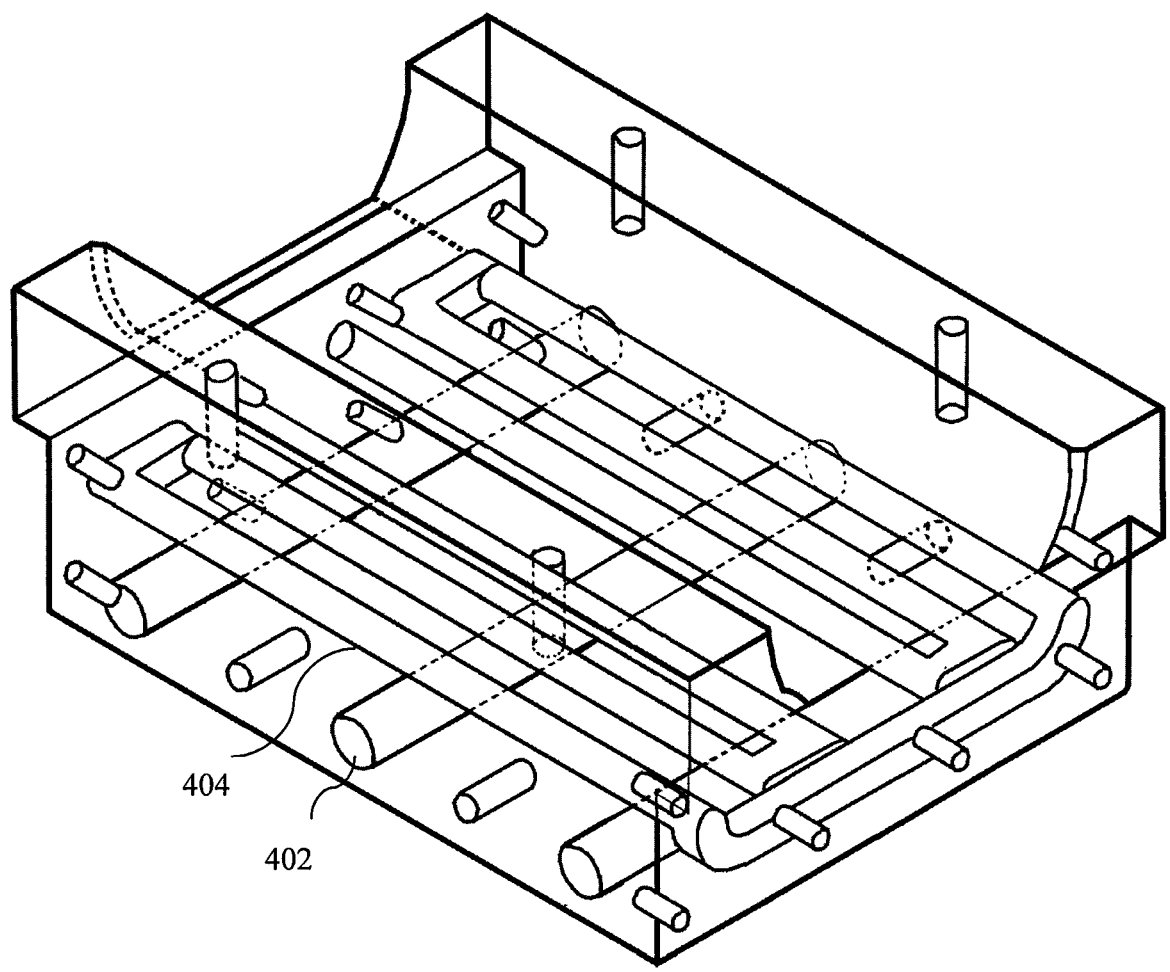
FIG. 5 is the isometric view of a second barrel pad, according to an embodiment of the invention.

FIG. 5 is the isometric view of second barrel pad 206 according to an embodiment of the invention. Second barrel pad 206 has a design similar to first barrel pad 204, the description remaining same as that of first barrel pad 204. The overall design of first barrel pad 204 and second barrel pad 206, including but not limited to, the spatial arrangement of cooling channels 404 and material employed for first barrel pad 204 and second barrel pad 206, ensures uniform temperature on the inner surface of extruder liner 202.

Figure 6:
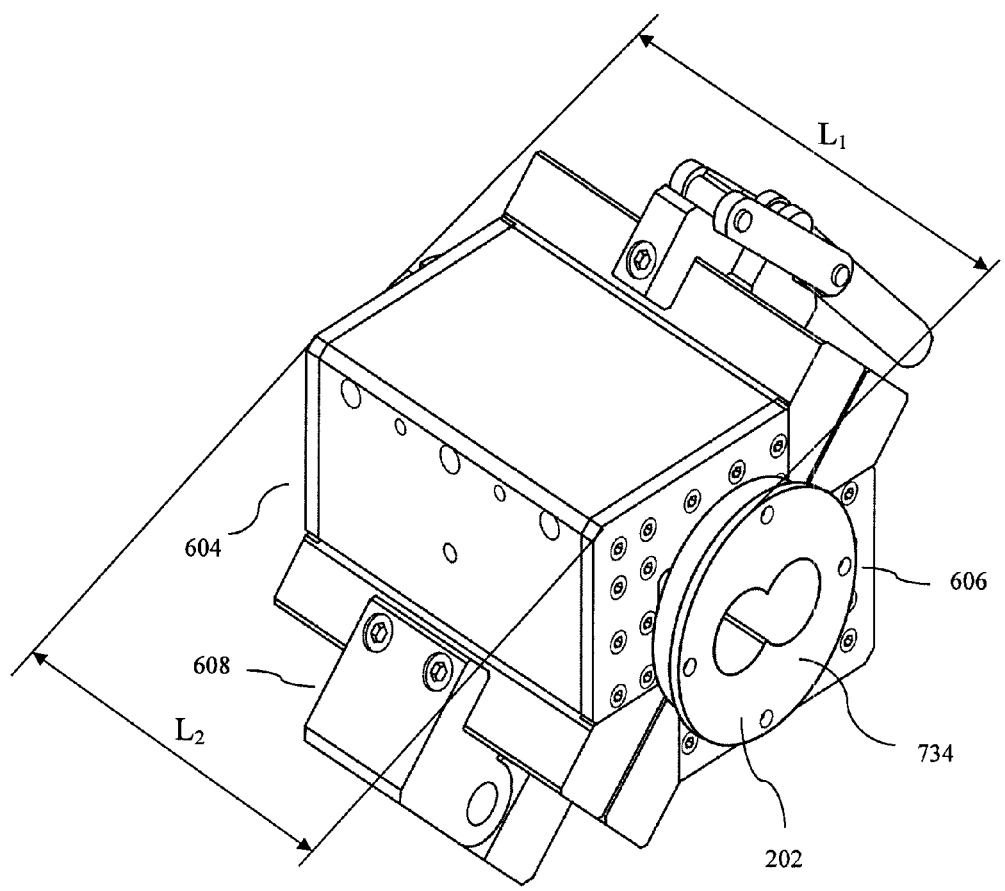
FIG. 6 is the isometric view of barrel section, according to another embodiment of the invention.

According to another embodiment, first barrel pad 604 and second barrel pad 606 may have a different design, with their adjacent faces diagonal to each other (as shown in FIG. 6). In this embodiment, first barrel pad 604 and second barrel pad 606 are clamped to each other with the help of toggle clamps 608.

Figure 7:
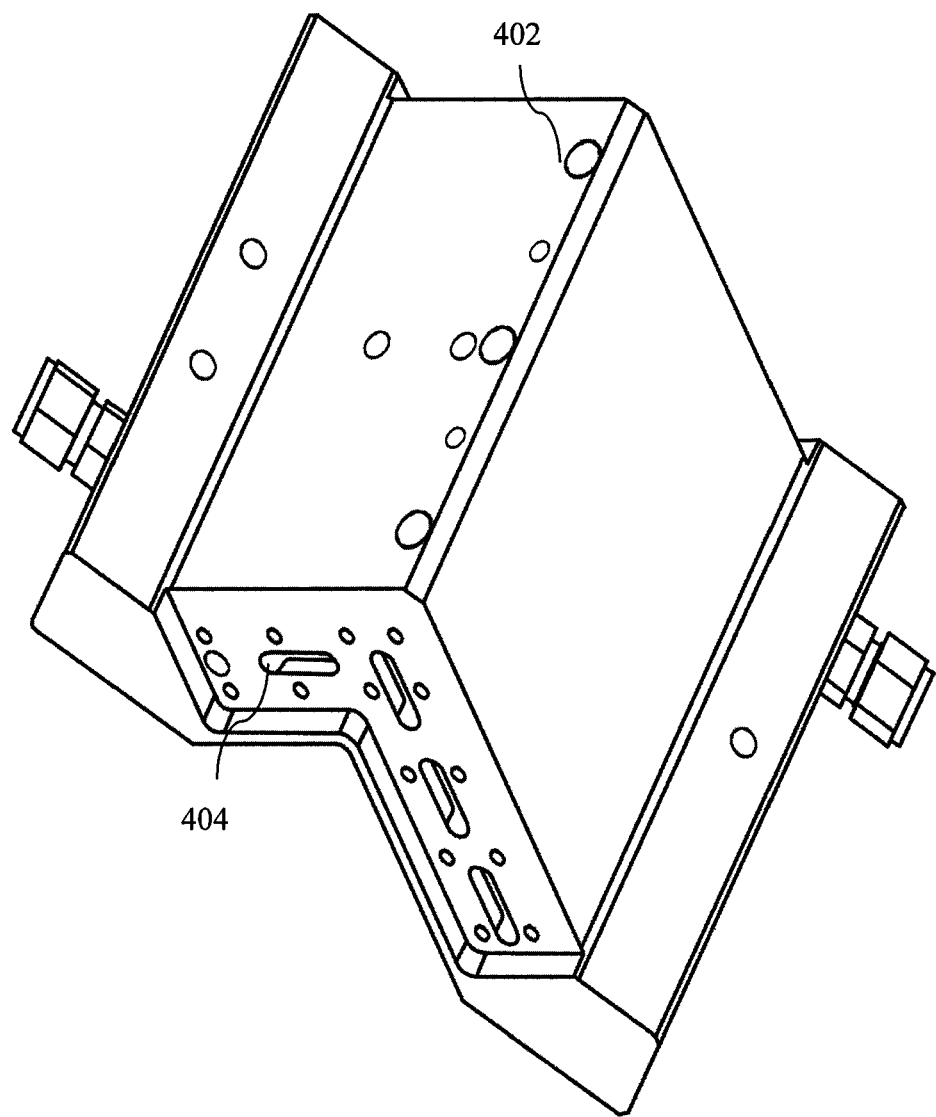
FIG. 7 is the isometric view of first barrel pad, according to another embodiment of the invention.

FIG. 7 is the isometric view of first barrel pad 604. The description for first barrel pad 604 is similar to that described in conjunction with FIG. 4A, FIG. 4B and FIG. 4C.

Figure 8:
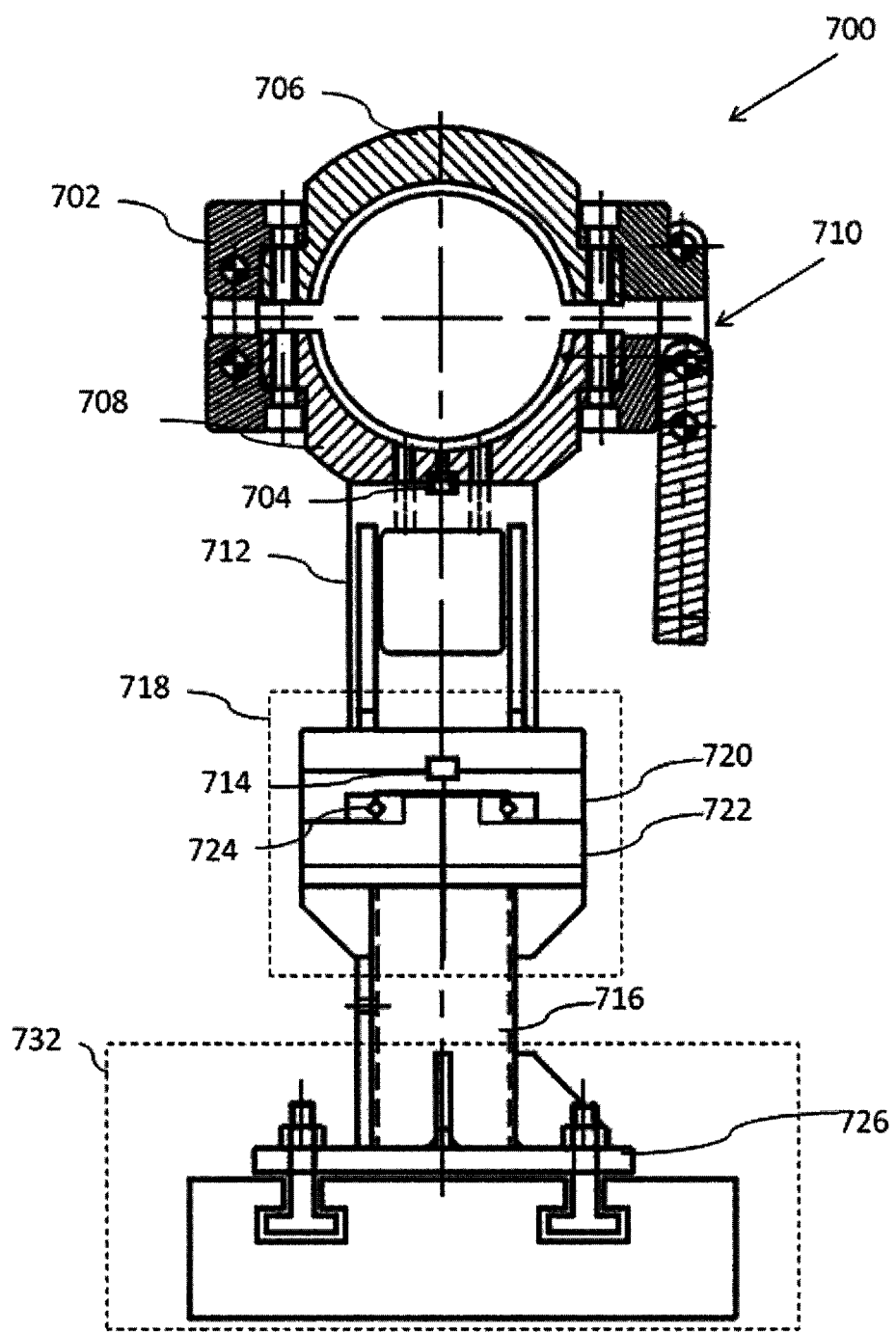
FIG. 8 illustrates the side view of a clamping system, according to an embodiment of the invention.

Referring next to FIG. 8, the clamping system 700 includes a clamp 702 and a support structure 718. The Clamp 702 includes an upper arm 706 and a lower arm 708 connected to the upper arm 706 at one edge of the upper arm 706. The upper and lower arm 706, 708 cooperates to define a recess configured to receive the end surfaces of adjoining extruder liners 202. The clamp 702 further includes a locking structure 710 configured to lock the upper arm 706 to the lower arm 708 with the pair of extruder liners 202 therebetween.

The clamp 702 is mounted on a bracket 712 by any suitable means such as with the help of a key 704. The bracket 712 is connected to a support column 716 such that relative movement between them in the axial direction is permitted. The bracket 712 and the column 716 may be mounted in slidable engagement. The column 716 is mounted on a base of the extruder. In the embodiment illustrated, the support structure 718 is mounted on a guide rail system 732 that is provided on the extruder base.

Figure 9:
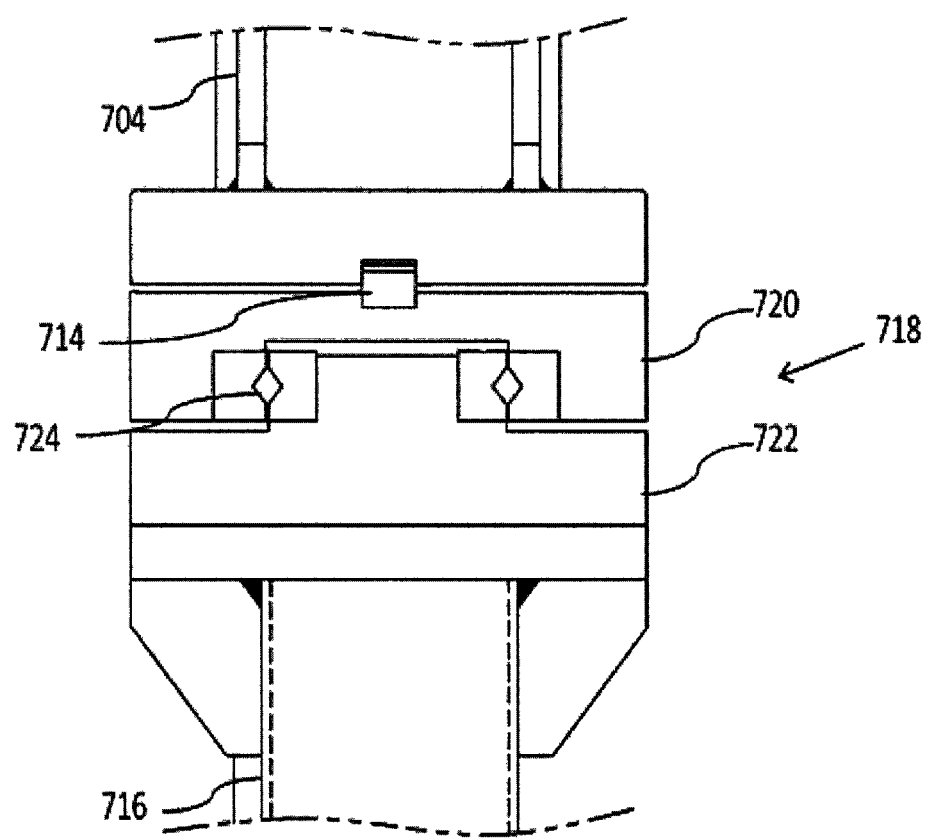
FIG. 9 is the side view of the barrel support structure according to an embodiment of the invention.

Referring next to FIG. 9, the relative axial movement between the bracket 712 and the column 716 may be achieved by mounting a linear bearing between them. The bracket 712 is mounted on an outer race 720 of linear bearing with the help of a key 714. Outer race 720 can slide on an inner race 722 of the linear bearing with the help of rotating elements 724. Inner race 722 is attached to column 716 that is fixed on a base plate 726. This sliding between the outer and inner race 720, 722 provides a linear movement to clam relative to the extruder base.

In accordance with an embodiment, the support structure 718 may be of adjustable height to accommodate different barrel sections 100 and to further ease assembly of barrel. The length of the support structure 718 can be varied as per specific requirements of the extruder.

According to an embodiment, the upper arm and the lower arm 706, 708 each comprises of a projection configured to engage a corresponding slot 728 of the extruder liner 202.

Figure 10:
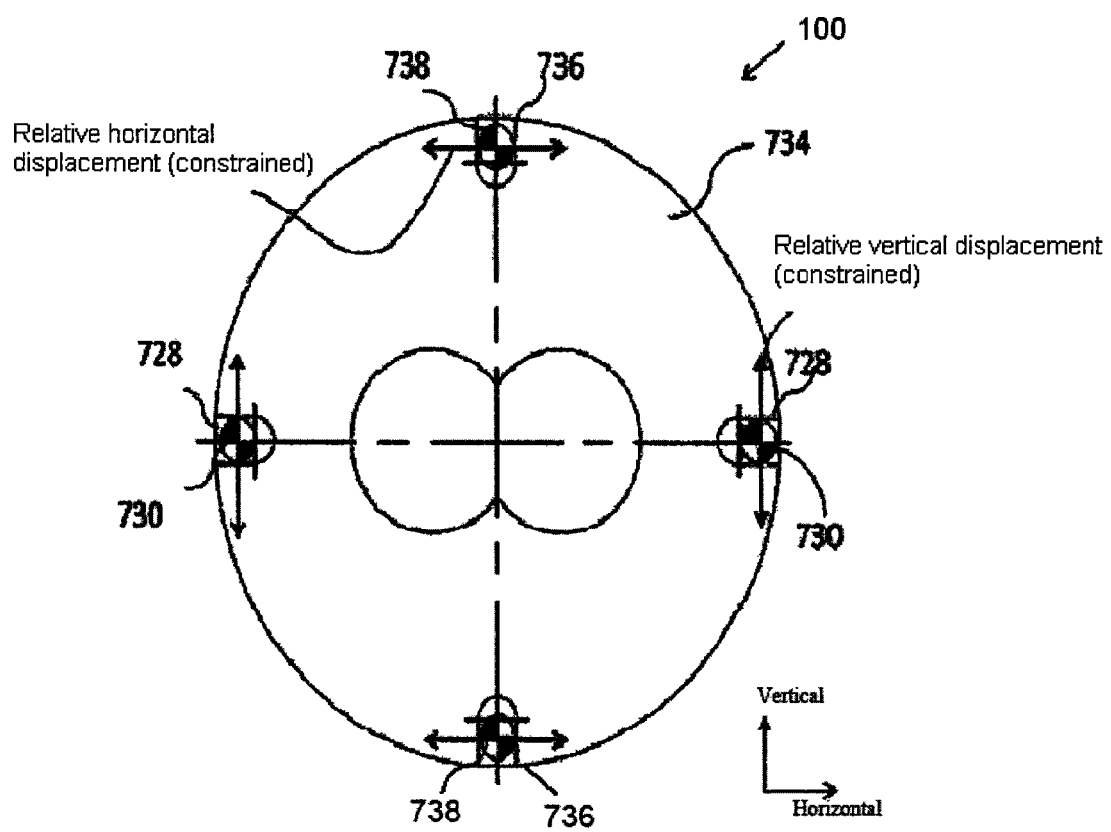
FIG. 10 is a sectional view of a pair of extruder liners abutting each other according to an embodiment of the invention.

The end surface 734 of the extruder liner may be provided with a plurality of alignment pins or a plurality of corresponding slots, as described in greater detail below. FIG. 10 depicts a sectional view of the two end surfaces of a pair of extruder liners that are configured to abut each other. A pair of horizontal alignment pins 730 along the horizontal axis of the extruder liner 202 and a pair of vertical alignment pins 738 along the vertical axis of the extruder liner 202, collectively alignment pins, are fixed on the end surface 734. The plurality of alignment pins 730, 738 can be fixed on the end surface 734 by means of screwing in the threads on the first end, welding on the first end or any other joining means known in the art. The alignment pins 730 shown in FIG. 3 are cylindrical. However, alignment pins 730 with tapering end, rectangular shape or any other cross section can be used in other embodiments of the invention.

A pair of horizontal slots 728 and pair of vertical slots (collectively slots) 736 are machined on the end surface 734 of the extruder liner 202 or on the end surface 734 of an extruder liner 202 that is to abut the end surface 734 of the extruder liner 202 having the alignment pins 730, 738. The plurality of slots 728, 736 is machined by methods like milling, grinding and other machining means available in the art. The slot 728, 736 is dimensioned proportional to the alignment pin to be received by it. The dimensions of the slots 728, 736 are configured to accommodate relative thermal expansion between the pair of extruder liners. The width of the slot 728, 736 is substantially equal to that of the alignment pin 730, 738 to be received by it so as to prevent any relative movement between the extruder liners in one direction. The length of the slot 728, 736 is larger than the width of the alignment pin 730, 738 so as to permit relative thermal expansion between the extruder liners 202 in one direction. The horizontal alignment pins 730 are capable of movement along the slot 728 length. However, movement of the horizontal alignment pins 730 along the breadth of corresponding slot 728 is constrained. Similarly, the vertical slots 736 allow thermal expansion of pair of vertical alignment pins 738 along its length. However, movement of each of pair of vertical alignment pins 738 along the breadth of corresponding vertical slot 736 is constrained.

Referring back to FIG. 3, the extruder liner 202 may have alignment pins 730 on one end surface and a plurality of slots 728 on the other end surface 734.

FIG. 10 depicts the methodology in which an embodiment of the invention prevents relative displacement of the pair of extruder liners in conditions of differential force distributions. FIG. 10 shows end surface 734 of extruder liners 202 engaged with each other. The plurality of alignment pins 730, 738 of first extruder liner 202 are represented by shaded circles. During the operation of twin screw extruder, the work material is subjected to different processes in different barrel sections. Hence, the different barrel sections experience unequal force distributions. As a result, first barrel section (not shown in FIG. 5) tends to displace in horizontal as well as in vertical direction with respect to second barrel section, as represented by double headed arrows. Pair of vertical slots 736 prevents horizontal displacement of pair of vertical alignment pins 738. Hence, the horizontal motion of first barrel section 100 with respect to second barrel section is prevented by pair of vertical grooves. Similarly pair of horizontal slot 728 prevents vertical displacement of pair of horizontal alignment pins 730. Hence, the vertical displacement of first barrel section 100 with respect to second barrel section (not shown) is prevented.

Specific Embodiments are Described Below

An extruder barrel section comprising a first barrel pad and a second barrel pad; the first and second barrel pad co-operating to define a recess configured to receive an extruder liner; the length of the first and second barrel pad less than the length of the extruder liner such that the extruder liner defines an end surface that projects beyond the extruder barrel section on at least one side, the end surface configured to abut the end surface of another extruder liner and a locking structure configured to lock the first barrel pad to the second barrel pad with the extruder liner therebetween.

Such extruder barrel section(s), wherein at least one of the first barrel pad or the second barrel pad includes a heating structure for heating the barrel pad.

Such extruder barrel section(s), wherein at least one of the first barrel pad or the second barrel pad includes a cooling structure for cooling the barrel pad.

Such extruder barrel section(s), wherein the first barrel pad and the second barrel pad are made of a material having good conductivity.

Further Specific Embodiments are Described Below

An extruder barrel section comprising a first barrel pad, a second barrel pad, an extruder liner, the first and second barrel pad co-operating to define a recess configured to receive the extruder liner; the length of the first and second barrel pad less than the length of the extruder liner such that the extruder liner defines an end surface that projects beyond the first and second barrel pads on at least one side, the end surface configured to abut the end surface of another extruder liner and a locking structure configured to lock the first barrel pad to the second barrel pad with the extruder liner therebetween.

Such extruder barrel section(s), wherein the end surface of the extruder liner includes either a plurality of alignment pins or a plurality of slots; each alignment pin configured to be received by a corresponding slot defined on the end surface of the extruder liner abutting it, wherein the slot has a width substantially equal to that of the alignment pin and a length larger than the width of the alignment pin permitting relative thermal expansion between the pair of extruder liners.

Such extruder barrel section(s), wherein the end surfaces of abutting extruder liners are clamped together by a clamping structure comprising a clamp including an upper arm, and a lower arm connected to the upper arm at one edge of the upper arm, the upper and lower arms cooperating to define a recess configured to receive the end surfaces of adjoining extruder liners, and a locking structure configured to lock the upper arm to the lower arm with the pair of extruder barrel sections therebetween; and a support structure for the clamp comprising a bracket connected to the clamp and a column connected to a base of the extruder, the bracket and column connected to each other such that relative movement between the bracket and the column is permitted axially along the extruder barrels sections.

Such extruder barrel section(s), wherein the bracket and the column are configured to accommodate axial thermal expansion in the extruder liners.

Such extruder barrel section(s), wherein the column is connected to a guide rail permitting relative axial movement between the column and the extruder base.

Such extruder barrel section(s), wherein the end surface of the extruder liner includes an engagement structure to engage the clamp.

INDUSTRIAL APPLICABILITY

The barrel sections as described permit linear expansion of the processing section of the extruders, the extruder liners. The barrel section formed of the barrel pads, rides on the extruder liner and does not cause stresses on account of expansion or contraction. The clamping together of parts that are at the process temperature improves the strength and life of the barrel sections. The system described allows for ease in maintenance and assembly, with extruder liners being easily replaced without any damage to the barrel section.

In addition, the use of alignment pins further allows relative thermal expansion between the extruder liners and barrel sections while the clamping system aids in the axial expansion of the extruder liners or barrel sections. Collectively, the system described provides for an extruder system having a longer life and ease in assembly and maintenance.

While example embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

We claim:

1. An extruder barrel section comprising:
a first barrel pad,
a second barrel pad,
an extruder liner;
the first and second barrel pad co-operating to define a recess configured to receive the extruder liner; the length of the first and second barrel pad less than the length of the extruder liner such that the extruder liner defines an end surface that projects beyond the first and second barrel pads on at least one side, the end surface configured to abut the end surface of another extruder liner; and
a locking structure configured to lock the first barrel pad to the second barrel pad with the extruder liner therebetween;
wherein the extruder barrel section (200) is configured for coupling with the other extruder barrel section by coupling the end surfaces (734) of the extruder liners (202);
wherein the end surface of the extruder liner includes either a plurality of alignment pins or a plurality of slots; each alignment pin configured to be received by a corresponding slot defined on the end surface of the extruder liner abutting it, wherein the slot has a width substantially equal to that of the alignment pin and a length larger than the width of the alignment pin permitting relative thermal expansion between the pair of extruder liners.

2. An extruder barrel section as claimed in claim 1 wherein the end surfaces of abutting extruder liners are coupled together by a clamping structure comprising a clamp including an upper arm, and a lower arm connected to the upper arm at one edge of the upper arm, the upper and lower arms cooperating to define a recess configured to receive the end surfaces of adjoining extruder liners, and a locking system configured to lock the upper arm to the lower arm with the pair of extruder barrel sections therebetween; and a support structure for the clamp comprising a bracket connected to the clamp and a column connected to a base of the extruder, the bracket and column connected to each other such that relative movement between the bracket and the column is permitted axially along the extruder barrels sections.

3. An extruder barrel section as claimed in claim 2 wherein the bracket and the column are configured to accommodate axial thermal expansion in the extruder liners.

4. An extruder barrel section as claimed in claim 2 wherein the column is connected to a guide rail permitting relative axial movement between the column and the extruder base.

5. An extruder barrel section as claimed in claim 1 wherein the end surface of the extruder liner includes an engagement structure to engage the clamp.

* * * * *